Figure 1:
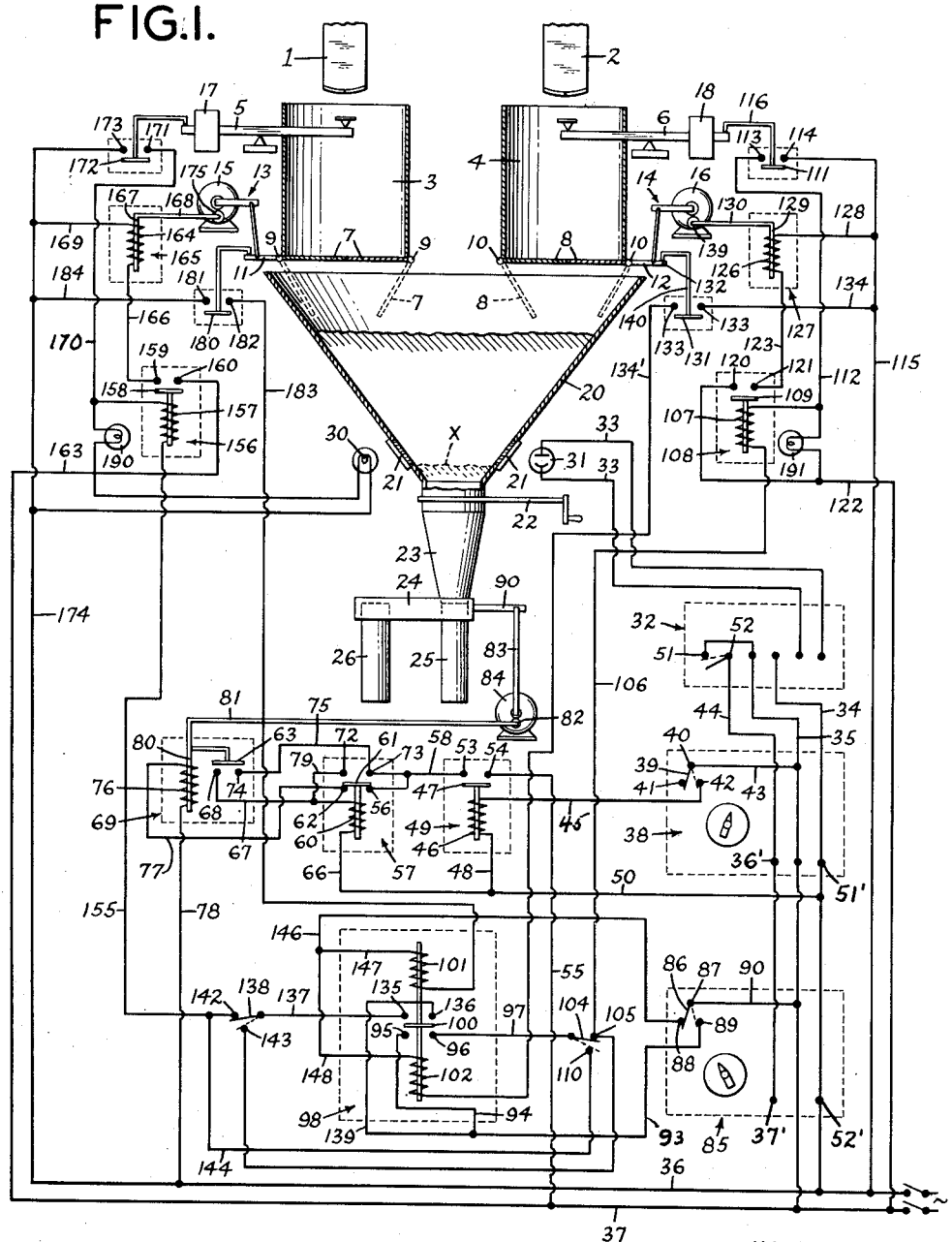

Nov. 24, 1953    T. J. SKEUSE ET AL    2,660,394
MATERIAL LOADING DEVICE
Filed Aug. 30, 1950    2 Sheets-Sheet 1

INVENTORS.
THOMAS J. SKEUSE
ARTHUR C. JENNINGS
WARREN E. HAUGHT
BY *Max Geldin*
ATTORNEY.

Nov. 24, 1953  T. J. SKEUSE ET AL  2,660,394
MATERIAL LOADING DEVICE
Filed Aug. 30, 1950  2 Sheets-Sheet 2

INVENTORS.
THOMAS J. SKEUSE
ARTHUR C. JENNINGS
WARREN E. HAUGHT
BY
ATTORNEY.

Patented Nov. 24, 1953

2,660,394

UNITED STATES PATENT OFFICE 2,660,394

MATERIAL LOADING DEVICE

Thomas J. Skeuse, Wilmington, Arthur C. Jennings, Edge Moor, and Warren E. Haught, Wilmington, Del., assignors to Allied Chemical & Dye Corporation, New York, N. Y., a corporation of New York Application August 30, 1950, Serial No. 182,378

17 Claims. (Cl. 249—18)

This invention relates to a container filling apparatus and is more particularly concerned with a novel device for automatically weighing material to be packaged and rapidly loading it into containers such as bags.

Various types of equipment for filling containers, including bags, are presently on the market and in use. While many of these devices are of an automatic or semiautomatic nature, in order to obtain a maximum rate of production in the packing of free-flowing materials, the need has existed for a completely automatic weighing and loading device to accurately weigh and load such materials into suitable containers with a minimum time requirement for removal of a full container of material and shifting of an empty one to be filled in its place, and to provide substantially continuous flow of material into the containers.

One object of the invention accordingly is to provide novel apparatus for introducing predetermined amounts of material into containers. Another object is the provision of a device for automatically and rapidly loading free-flowing materials into containers involving a minimum time requirement for shifting from a full to an empty container and substantially continuous flow of material into the containers. The invention further aims to provide a device permitting maximum rate of delivery of successive measured charges of material into containers under conditions such as to have substantially continuous filling of the containers synchronized with other related operations of the device. Another object of the invention is the provision of apparatus for filling containers comprising means operable in response to passage of a charge of material through a container loading hopper, to empty a weighed scaleful of material and transfer it to the hopper, and to remove a full container of material from beneath the hopper and shift an empty container into its place in time to receive the material being transferred from the scale to the hopper. Yet another aim of the invention is to provide an automatic weighing and loading device for filling containers, particularly bags, wherein the descent of material past a predetermined level in a loading hopper actuates a photoelectric cell unit which in turn operates mechanisms for dumping a scaleful of material into the hopper and removing a full container of material from beneath the hopper while shifting an empty container into its place to receive the material being dumped into the hopper, the operation of the scale dumping and bag shifting mechanisms being so timed as to provide an almost continuous flow of material into the containers and a high production capacity. Other objects and advantages of the invention will appear hereinafter.

In its broadest aspect, the invention device comprises means for measuring a predetermined amount of material and to discharge it after measurement as a succession of separate charges, container supporting means to support a container in position to receive material flowing from the measuring means, transfer means to transfer such flow as desired from one container to another, a detector positioned at a selected location along the path of flow of material between the container supporting means and the measuring means, the detector being adapted to deliver energy upon passage thereby and through said path of a charge of such material, and operating means responsive to energy so produced interconnecting the measuring means and the detector to effect release of a measured charge from the measuring means, whereby successive, separate, measured charges of material are released into the path between the measuring means and a container in response to passage past a selected location within such path of a previously released measured charge. Accordingly, the invention device is designed to permit maximum rate of delivery of successive measured charges of material into containers consistent with other related operations of the device, e. g. transfer of material feed from a full container to an empty one, so as to have substantially continuous filling of the containers synchronized with such related operations.

From another standpoint the apparatus of the invention comprises in combination means for measuring a predetermined amount of the material, a second means adapted to receive such predetermined amount of material from the measuring means and to feed the material into containers, means for supporting a container in position to receive material from the second means, operating means responsive to predetermined discharge of material from the second means, and means responsive to operation of the latter means to transfer feed of material from one container to another in filling position with respect to the second means, and to discharge a predetermined amount of material from the measuring means to the second means.

In a specific embodiment of the invention as described herein, the invention device comprises a photoelectric cell unit, including a light source and a photoelectric cell positioned at opposite sides of a container loading hopper and near the bottom thereof, which unit is actuated when the level of material flowing through the hopper has descended to a point below the light source and thus permits it to strike the photoelectric cell. Actuation of the photoelectric cell unit operates a relay which in turn actuates a first electromagnetic means for transferring an automatically weighed scaleful of material into the hopper and then actuates a second electromagnetic means to transfer a full container of material away from the bottom of the hopper and to shift an empty container into position in its place. The material being dumped into the hopper from the scale commences to enter the hopper before the residual material in the bottom thereof and below the photoelectric cell unit has been discharged, and the full container of material is removed as soon as such residual material has entered the container.

In the preferred embodiment, as hereinafter more fully described, the invention device comprises a photoelectrically activated apparatus for rapidly and accurately filling containers such as bags from a single hopper into which material being supplied to the bags is weighed by one of two alternate scales while the other scale is automatically being loaded and made ready to load the feeding hopper when the photoelectric cell device associated therewith indicates that the feed hopper has substantially emptied its contents into a receiving bag and a new bag has been placed under the feeding hopper to receive a succeeding weighed load. Electromagnetic mechanisms in the form of two solenoids are provided and are controlled by actuation of the photoelectric device, one of such solenoids functioning to dump a scaleful of material into the hopper and the other acting to remove a full bag and to shift an empty bag into place beneath the hopper to receive such material in proper sequence. This assembly decreases the time required between the completion of one bag filling operation and the start of the next, and provides an almost continuous flow of material into the bags.

Figure 2:
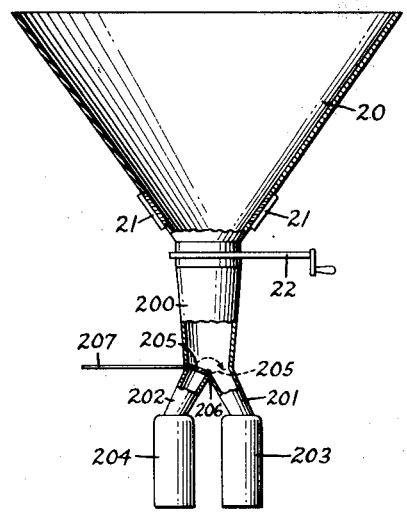

The accompanying drawing forming a part of this specification shows, for purposes of exemplification, a preferred apparatus in which the invention may be embodied and practiced, but without limiting the invention specifically to such illustrative instances. In the drawing, Figure 1 is a schematic representation of the invention device, and Figure 2 is a modification of a feature of the device of Figure 1.

Referring to the drawing, material to be packed in bags is fed from filling spouts 1 and 2 into weigh buckets 3 and 4, respectively, which are positioned on beams 5 and 6 of scales 17 and 18. Weigh buckets 3 and 4 are each provided at their bottom with a pair of gates 7 and 8, respectively, gates 7 being adapted to be opened by swinging movement about pivot points 9, and gates 8 being similarly adapted to be opened by swinging movement about pivot points 10. The gates of weigh buckets 3 and 4 are operably attached to arms 11 and 12, respectively, for actuation through linking mechanisms 13 and 14, respectively, by motor driven units 15 and 16.

Below weigh buckets 3 and 4 is positioned a loading hopper 20 having two windows 21 located opposite each other near the bottom of the hopper. A flow control valve 22 is positioned in the bottom of hopper 20 for regulating the flow of material through chute 23 connected to the bottom of the hopper. Positioned immediately below chute 23 is a bag support 24 having suitable means (not shown) for attachment of two bags 25 and 26, each adapted to be located immediately below the opening of chute 23 to receive material flowing into the bags from the hopper. Bags 25 and 26 are each of a size suitable to accommodate the contents of one weigh bucket of material to be packaged. Bag support 24 is adapted to be shifted, by mechanism hereinafter described, to properly position either bag 25 or bag 26 into operable relationship below chute 23.

A photoelectric cell unit is provided comprising a light source 30 and a photoelectric cell 31 located opposite windows 21 near the bottom of hopper 20. Photocell 31 is placed in circuit with a photocell relay 32 by means of conductors 33, and relay 32 has leads 34 and 35 connected to main power supply lines 36 and 37, respectively. Line 35 is attached to two time relays 38 and 85 through leads 43 and 90, respectively. Relay 32 is provided with terminals 51 and 52, the former being connected to line 35 and the latter being attached to a line 44 which is in turn connected to relays 38 and 85 at terminals 36' and 37', respectively. Lead 34 is also attached to time delay relays 38 and 85 at terminals 51' and 52', respectively. Time delay relay 38 controls electromagnetic means for bag transfer and time delay relay 85 controls electromagnetic means for weigh bucket dumping, as fully described hereinafter.

Time delay relay 38 has a switch 39 adapted to pivot about a terminal 40 and to make contact with either terminals 41 or 42. Conductor 43 is attached at one end to line 35 and at the other to terminal 40. Lead 45 connects terminal 42 with one end of the coil 46 of relay 49 and lead 48 connects the other end of the coil to line 50 and lead 34. Terminal 54 of relay 49 is connected by lead 55 to power line 37, and a lead 58 connects terminal 53 of relay 49 with terminal 56 of another relay 57. Switch 47 operated by coil 46 is adapted to close the circuit between contacts 53 and 54 of relay 49.

Relay 57 is provided with a coil 60 operating a switch 61, the latter being adapted to close the circuit between contact 56 and another contact 62. One end of coil 60 is connected through lead 66 to conductors 50 and 34, and the other end of the coil is connected through lead 67 with one terminal 68 of a limit switch 63 on a solenoid 69. Relay 57 also has terminals 72 and 73, terminal 73 being connected to the other terminal 74 of limit switch 63 on solenoid 69, by means of lead 75, while terminal 72 of relay 57 is connected to lead 67 through conductor 79.

Terminal 62 of relay 57 is connected to one end of coil 76 of solenoid 69 by means of lead 77, the other end of the coil having connection with main line 36 through line 78. Armature 80 of solenoid 69 is connected to a clutch lever 81 adapted to actuate a clutch 82 for operating a motor driven unit 84 connected to linkage 83 which is attached to bag support 24 through arm 96. The unit 84, through linkage 83 and arm 96 connected to bag support 24, shifts the bag support to the right or to the left. Clutch mechanism 82, of conventional structure, is so arranged that on energization of the solenoid 69 and consequent movement of the armature thereof downwardly, bag support 24 will reciprocate first in one direction, say to the right, for shifting an empty bag (26) into position below chute 23, and then in the opposite direction in a succeeding cycle for positioning another empty bag fastened on bag support 24 in place of full bag 25, into operative relationship for loading below chute 23.

Time delay relay 85 is provided with a switch 86 pivoted at terminal 87 and adapted to make contact with either terminals 88 or 89. Terminal 87 is connected through lead 90 to conductor 35. Terminal 89 has attached thereto a lead 93 which in turn is connected to a terminal 95 of a latch-in or transfer relay 98 by means of lead 94, the opposite terminal 96 of relay 98 being connected to a transfer switch 104 by means of lead 97. Switch 104 is arranged to make contact with either terminals 105 or 110. Relay 98 is also provided with another pair of terminals 135 and 136, and these terminals and terminals 95 and 96 are alternately adapted to be placed in circuit by the double acting switch 100. Terminal 135 is connected by means of lead 137 to a second transfer switch 138 adapted to make contact with either of the terminals 142 or 143. Contact 136 has attachment through leads 139 and 93 to terminal 89 of time delay relay 85. The terminal 110 of transfer switch 104 and the terminal 142 of transfer switch 138 are connected by means of lead 144. Terminal 88 of relay 85 is connected to one end of coil 101 of double acting switch 100 by means of leads 146 and 147, and to one end of coil 102 of switch 100 by means of leads 146 and 148.

Terminal 105 of transfer switch 104 is connected by means of lead 106 to one end of coil 107 of relay 108, said coil being arranged to operate a switch 109. The other end of coil 107 is connected by means of a lead 112 to a terminal 113 of a limit switch 111, the opposite terminal 114 of which is in turn connected to main line 36 through lead 115. Limit switch 111 has an arm 116, the end of which is located closely adjacent scale beam 6 and is arranged to be contacted thereby as the material in bucket 4 approaches full weight. This switch is adapted to close the circuit between terminals 113 and 114 when the material in weigh bucket 4 has reached the predetermined weight for which the scale is set. Relay 108 is provided with terminals 120 and 121, the latter having connection through lead 123 to one end of coil 126 of solenoid 127, terminal 120 being connected to lead 122 in turn attached to main line 37.

The other end of coil 126 of solenoid 127 is permanently attached to lead 115 by means of lead 128. Armature 129 of solenoid 127 is attached by means of clutch lever 130 and through clutch 139 to motor driven unit 16. On energization of solenoid 127, movement of the armature 129 in response thereto causes actuation of clutch 139 and operation of motor driven unit 16 with consequent movement and rotation of linking mechanism 14 and arm 12 in an upward direction to open gates 8 of weigh bucket 4 to the dotted line position indicated. A limit switch 131 is provided, arm 140 of which is adapted to make contact with an extension 132 of arm 12 on one of gates 8 when the latter are opened. The switch then closes the circuit between terminals 133, one of which has connection by means of lead 134 to lead 115, the other being connected by means of lead 134' to the opposite end of coil 102 from its point of attachment with lead 148 in relay 98.

Terminal 142 of transfer switch 138 is attached through lead 155 to one end of a coil 157 of a relay 156, the other end of the coil being connected by lead 170 to a terminal 171 of a limit switch 172, the other terminal 173 of which is placed in circuit with main line 36 by means of conductor 174. Coil 157 operates a switch 158 adapted to close the circuit between contacts 159 and 160. Lead 163 connects terminal 160 with line 37, and terminal 159 is placed in circuit with one end of coil 164 of solenoid 165 through lead 166, the other end of the coil being permanently attached to main line 36 through conductors 169 and 174.

Armature 167 of solenoid 165 is attached through a clutch lever 168 and clutch 175 to motor driven unit 15 for operation of linking mechanism 13 and arm 11 to actuate gates 7 of weigh bucket 3 in the manner noted above with respect to operation of gates 8 of weigh bucket 4. A limit switch 180 is provided having terminals 181 and 182, the latter being connected by means of lead 183 to the other end of coil 101 of transfer relay 98, from its point of attachment with lead 147. Terminal 181 of limit switch 180 is connected by means of leads 184 and 174 to main line 36. Lamps 190 and 191 are provided to indicate when weigh buckets 3 and 4, respectively, have reached their set weight and are filled.

Relay 156, solenoid 165 and limit switches 172 and 180 are of the same construction and operate in the same manner as described above with respect to relay 108, solenoid 127 and limit switches 111 and 131, respectively.

*Operation*

Assuming that weigh bucket 3 has just dumped its contents into hopper 20, when the level of the material therein falls below the two windows 21, say to the dotted line position X, illumination from light source 30 strikes the photoelectric cell 31 and activates the photocell relay 32. This causes contacts 51 and 52 of photocell relay 32 to make, starting the time cycles of the two time delay relays 38 and 85. The time cycle of relay 85 is normally set for a shorter time interval than that of relay 38.

At the completion of the set time of time delay relay 85, a circuit is made between contacts 87 and 89 of relay 85, thus supplying current from main line 37 through conductors 35, 90, 93 and 94 to terminal 95 on latch-in or transfer relay 98. At this time the double acting switch 100 is in contact with terminals 95 and 96, and main line 37 is thus applied through these terminals, transfer switch 104 and line 106, to one end of the holding coil 107 on relay 108. Assuming weigh bucket 4 has been filled to its proper weight, the full weight limit switch 111 will be closed and main line 36 is applied by means of conductor 115 through this limit switch to the other end of holding coil 107 on relay 108, thus completing the circuit through time delay relay 85 and transfer relay 98. Then contacts 120 and 121 on relay 108 will close, completing the circuit from main line 37 through solenoid 127 to main line 36 by means of lines 122, 123, 128 and 115. Solenoid 127 will thus be energized, causing gates 8 of weigh bucket 4 to open to the dotted line position shown and to dump its contents into hopper 20.

A short time after the completion of the time cycle of time delay relay 85, the time cycle of time delay relay 38 will be completed and the circuit closed between contacts 40 and 42 thereof. Current will then pass from line 37 through lines 35, 43, 45, coil 46 and conductors 48, 50 and 34 to main line 36, thus energizing coil 46 and causing switch 47 to close the circuit between contacts 53 and 54 of relay 49. Current from main line 37 will thus be applied through line 55, contacts 53 and 54 of relay 49, conductor 58, the normally closed terminals 62 and 56 on relay 57, line 77, coil 76 of solenoid 69 and line 78 to main line 36. The armature 80 of solenoid 69 then quickly moves downwardly, actuating the clutch lever 81 which in turn causes operation of motor driven unit 84 and lateral movement of arm 90 and bag support 24 to the right to transfer the full bag of material 25 away from beneath chute 23 and shift an empty bag 26 into position below chute 23. When the armature 80 of solenoid 69 nears the end of its downward stroke, contacts 68 and 74 are closed by limit switch 63, energizing holding coil 69 of relay 57 through lines 36, 34, 50, 66, 67, 75, 58, 55 and 37, and opening the circuit between contacts 56 and 62, so that the solenoid imparts only a momentary impulse to lever 81 and bag support 24 for transferring bag 26 into operable relationship with chute 23 and shifting full bag 25 away from operative position, full bag 25 being then removed from the bag support and another empty bag fastened to the support in its place. Solenoid 69 will only be energized again during a succeeding cycle of operations (i. e. when contacts 56 and 62 on relay 57 are again closed) for shifting bag support 24 to the left for removal of bag 26 and placing the empty bag into proper location below chute 23.

Time delay relay 85 functions to permit the major portion of the material in the bottom of hopper 20 below windows 21 and in chute 23 to pass into bag 25 before weigh bucket 4 is dumped, but is set so that essentially none of the material being dumped into the hopper from weigh bucket 4 has progressed completely through the hopper and chute 23 before the full bag is removed. Time delay relay 38, set to operate after a longer time interval than time delay relay 85, functions to allow time for all of the material in transit between the windows 21 of the hopper 20 and the bottom of chute 23, to enter bag 25 before it has been shifted away from the bottom of the chute. It is apparent then that except for a very short interval of time during which full bag 25 is being moved away from the bottom of chute 23 and empty bag 26 is being shifted into position in its place, the mechanisms for bucket dumping and bag transfer are timed in response to actuation of the photoelectric cell 31 so that there is a substantially continuous flow of material into the bags. The invention device is designed to feed the contents of one weigh bucket into each bag, and the hopper 20 and chute 23 are momentarily essentially emptied during each cycle of operations for filling a bag.

When the material from weigh bucket 4 enters hopper 20, the photocell will be deenergized and this in turn deenergizes the two time delay relays 38 and 85. When time delay relay 38 returns to its normal position, wherein switch 39 makes contact with terminal 41, contacts 62 and 56 on relay 57 are again closed by switch 61 in readiness for a succeeding cycle of operations. When time delay relay 85 returns to its normal position, wherein switch 86 is in contact with terminal 88, main line 37 is connected through conductor 90, terminals 87 and 88 of relay 85 and conductors 146 and 148 to one end of coil 102 on transfer relay 98. Limit switch 131, which closes contacts 133 when the dump gates 8 on weigh bucket 4 are opened, connects main power line 36 by means of lines 115, 134 and 134′ to the other end of coil 102 from its point of attachment with conductor 148 in transfer relay 98. When coil 102 is thus activated, switch 100 is raised, breaking contact between terminals 95 and 96 and making contact between terminals 135 and 136, thus placing relay 98 in readiness for a succeeding cycle of operations.

While the material from weigh bucket 4 is progressing through hopper 20 and chute 23 for packing into bag 25, material is being loaded into weigh bucket 3 through chute 1. When the predetermined weight of material enters bucket 3, chute 1 is automatically closed by means not shown, and the weigh bucket is in readiness to be dumped into hopper 20.

As soon as the material previously dumped into hopper 20 from weigh bucket 4 falls below windows 21 of the hopper and light again energizes the photocell, the above described cycle of operations is repeated except that the contents of weigh bucket 3 are dumped into the hopper 20 by means of time delay relay 85, transfer relay 98, transfer switch 138, relay 156 and solenoid 165, and bag support 24 is shifted to the left instead of to the right. Limit switch 166, making contact when the dump gates of weigh bucket 3 are opened, causes switch 100 to break contact with terminals 135 and 136 and to make contact again with terminals 95 and 96.

If one scale, say scale 17, and its associated weigh bucket 3 should need to be shut down, operations can continue using scale 18 only and its associated weigh bucket 4, by throwing the transfer switch 138 of transfer relay 98 to the dotted line position shown, i. e. in contact with terminal 143. Relay 98 can then function to open gates 8 of the weigh bucket in use, i. e. bucket 4, regardless as to whether terminals 95 and 96 or terminals 135 and 136 are contacted by switch 100. Under these conditions the scale tripping (opening of dump gates 8) will generally be accomplished by the full weight limit switch 111, since the refill time of a weigh bucket is generally greater than the filling time of a bag.

On the other hand, if scale 18 and its associated weigh bucket 4 are shut down, operations can be continued using scale 17 only and its associated weigh bucket 3, by throwing transfer switch 104 to the dotted line position shown, i. e. in contact with terminal 110. Relay 98 then functions to open gates 7 of weigh bucket 3 regardless as to whether terminals 95 and 96 or terminals 135 and 136 are contacted by switch 100.

Various modifications may be made in the invention device without departing from the scope of the invention. Thus, bag support 24 may be a circular member adapted to support more than two bags thereon, and the support arranged to be rotated by means of arm 90 to alternately place each bag in position for filling under chute 23. Further, chute 23 and bag support 24 may be replaced by the modification shown in Figure 2, including a chute 200 having two downwardly extending legs 201 and 202, each being adapted to support a bag 203 or 204 at its lower end. A vane 205 pivoted at the point of intersection 206 of legs 201 and 202, is arranged, through essentially lateral movement of arm 207, to close off either leg 202, as shown, or leg 201 (dotted line position) from the upper portion of chute 200. Hence, in the full line position of vane 205 shown, bag 203 is being filled with material, and in the dotted line position of vane 205, bag 204 will be in position for filling. Arm 207 may be operated in a manner similar to arm 90 of Figure 1.

Instead of the photoelectric cell unit including light source 30 and photoelectric cell 31, various other detector devices may be employed and arranged to operate the scale dumping and feed transfer means of the invention apparatus. Thus, mechanical means such as a spring loaded or tripping mechanism may be installed at a preselected location in the path of material flow between the weigh buckets 3 and 4 and the bags, so as to operate time delay relays 38 and 85 at the proper time. Further, radioactive type detector means may be employed to actuate the time delay relays on passage of a charge of material past a selected location in the path of material flow between the weigh buckets and containers of the invention device. For example, a radioactive substance may be placed on the inside wall of hopper 20 corresponding to the location of one of windows 21, and a Geiger counter placed opposite thereto at a position corresponding to the other window 21. Descent of the level of the material in hopper 20 past the radioactive substance causes a change in effect of such substance on the Geiger counter, thus actuating the time delay relays.

It is to be understood that the detector device, e. g. the photoelectric cell unit described above, may be placed at any desired location in the path of flow of material between weigh buckets 3 and 4 and the containers or bags 25 and 26, provided operation of time delay relays 38 and 85 is effected in proper sequence. Hence, while the position of the photoelectric cell unit near the bottom of hopper 20 as shown in Figure 1 is preferred, the unit may be placed at a position in hopper 20 above that shown in Figure 1 or at some point in chute 23 below its position in Figure 1, provided the scale dumping and container transfer operations controlled by the detector device may be carried out in proper timed sequence for loading one weigh bucket of material into each container or bag in the rapid continuous manner described above. However, it is desirable to locate the detector device as close as possible to the containers being filled consistent with proper synchronism of the scale dumping and container transfer operations so as to accurately fill and remove the containers in very quick succession.

The combination of elements including hopper 20 and chute 23 for delivering material from weigh buckets 3 and 4 into the containers may be replaced by any other means for transferring material from the weigh buckets into the containers, such means being provided with a detector device, e. g. the photoelectric cell unit described above, for controlling dumping of the weigh buckets and container transfer. Thus, a single hopper or chute having inclined or straight sides may be utilized in place of hopper 20 and chute 23. Further, the invention device may be arranged so that material falls freely from the weigh buckets or scales directly into the containers without the use of an intermediate hopper and/or chute, the detector being placed in a suitable position with respect to the falling stream of material to operate the weigh buckets and container transfer means after a charge of material has passed the detector.

The above described electrical arrangement for actuating the solenoids which are adapted to dump the weigh buckets and to shift the bag support 24 of Figure 1 or the vane 205 of Figure 2, may be modified without departing from the spirit of the invention. Thus, for example, relay 49 interposed between time delay relay 38 and relay 57 may be omitted, although its presence is desirable for smoother operation.

Flow control valve 22 may be adjusted so as to increase or decrease the rate of flow of material from hopper 20 into the bag being filled. Such increase or decrease in rate of flow of material will in direct proportion increase or decrease the rate of operation and the capacity of the device.

Liquids as well as free-flowing solid substances, e. g. aluminum sulfate, may be packed by means of the invention device, and containers or receptacles other than bags employed for packing such substances.

From all of the foregoing, it is seen that applicants have provided a completely automatic weighing and container filling device enabling a maximum of productive capacity with a minimum of work and attention by the operator. In the preferred embodiments described above, once the time delay relays 38 and 85 have been set for the desired time intervals and the scales set for the desired weight of material to be packed in each bag, the apparatus may be placed in operation and the only function thereafter required by the operator is to remove the bags as they are filled and to fasten an empty bag in their place on the bag support. Should the device become clogged, the charge in hopper 20 will not pass the photoelectric cell unit and thus no dumping of weigh buckets 3 and 4 or shifting of bag support 24 will occur and the machine will thus automatically cease operating without attention from the operator. Experience has shown that rate of production can be doubled employing the device described herein as compared to certain bag loading machines now widely in use but not employing the above assembly. Actually, the sole factor limiting the rate of operation and capacity of the above described device is the maximum rate of speed at which a full bag can be substituted for an empty one.

As is known, bags or other containers are mainly supported by a platform and moved unidirectionally toward, through and away from a filling station located on the platform, the individual containers being indexed under a suitable device for delivery of the measured material for a time sufficient for filling of the container. The aspects of the present invention relating to control of the transfer of feed of a measured charge from one container to another, apply to systems of the type wherein the movement of containers is unidirectional equally as well as to systems of the type shown and described in detail here involving reciprocal movement of the container support. The invention device is designed to permit movement and indexing of successive containers at the maximum rate consistent with the flow characteristics within the loading system of the material being loaded.

It is to be understood that the invention contemplates all types of packaging equipment or embodiments thereof within the scope of the appended claims.

We claim:

1. Apparatus for introducing predetermined amounts of material into containers therefor comprising in combination means for measuring a predetermined amount of the material and to discharge it after measurement as a succession of separate charges, container supporting means to support a container in position to receive material flowing from said measuring means, transfer means to transfer such flow as desired from one container to another, a detector positioned at a selected location along the path of flow of material between said container supporting means and said measuring means, said detector being adapted to deliver energy upon passage thereby and through said path of a charge of said material, and operating means responsive to energy so produced interconnecting said measuring means and said detector to effect release of a measured charge from said measuring means, whereby successive, separate, measured charges of material are released into the path between said measuring means and said container in response to passage past a selected location within said path of a previously released measured charge.

2. Apparatus for introducing predetermined amounts of material into containers therefor comprising in combination means for measuring a predetermined amount of the material and to discharge it after measurement as a succession of separate charges, a second means adapted to receive said predetermined amount of material from said measuring means and to feed said material into containers, container supporting means to support a container in position to receive material flowing from said second means, transfer means to transfer such flow as desired from one container to another, a photoelectric cell unit positioned at a selected location with respect to said second means, said photoelectric cell unit being adapted to deliver energy upon passage thereby and within said second means of a charge of said material, and operating means responsive to energy so produced interconnecting said measuring means and said photoelectric cell unit to effect release of a measured charge from said measuring means, whereby successive, separate, measured charges of material are released into said second means in response to passage past a selected location therein of a previously released, measured charge.

3. Apparatus for introducing predetermined amounts of material into containers comprising in combination means for measuring a predetermined amount of the material, container supporting means to support a container in position to receive material flowing from said measuring means, operating means positioned at a selected location along the path of flow of material between said container supporting means and said measuring means, said operating means being responsive to downward passage of a charge of material thereby, and means responsive to operation of said last-named means to transfer feed of material from one container to another and means responsive to operation of said operating means to discharge a predetermined measured amount of material from said measuring means.

4. Apparatus for introducing predetermined amounts of material into containers comprising in combination means for measuring a predetermined amount of the material, a second means adapted to receive said predetermined amount of material from said measuring means and to feed said material into containers, means for supporting a container in position to receive material from said second-named means, operating means responsive to predetermined discharge of material from said second-named means, and means responsive to operation of said last-named means to transfer feed of material from one container to another in filling position with respect to said second-named means, and means responsive to operation of said operating means to discharge a predetermined measured amount of material from said measuring means to said second-named means.

5. Apparatus for introducing predetermined amounts of material into containers comprising in combination means for measuring a predetermined amount of the material, a second means adapted to receive said predetermined amount of material from said measuring means and to feed said material into containers, means for supporting a plurality of containers in position to receive material from said second-named means, operating means responsive to predetermined discharge of material from said second-named means, and means responsive to operation of said last-named means to actuate said container support to transfer a container from filling position with respect to said second-named means, transfer another container into filling position with respect to said second-named means, and means responsive to operation of said operating means to discharge a predetermined measured amount of material from said measuring means to said second-named means.

6. Apparatus for introducing predetermined amounts of material into containers comprising in combination measuring means for measuring predetermined charges of the material, a second means adapted to successively receive said predetermined charges of material from said measuring means, means for supporting a plurality of containers in position to receive charges of material from said second-named means, control means operated in response to almost complete passage of material from said second-named means, means actuated in response to operation of said control means for transferring a charge of material from said measuring means into said second-named means, and means actuated in response to operation of said control means for transferring a container of material from material-receiving position with respect to said second-named means and to shift an empty container into material receiving position with respect to said second-named means, said control means and means actuated in response to operation of said control means including timing means for controlling said container transferring and charge transferring means so that material in amount substantially equal to a measured charge is discharged from said second-named means into each container.

7. Apparatus comprising a scale member for receiving material to be weighed, a first means adapted to receive said material from said scale member and to feed said material into containers located below said means, a second means responsive to almost complete flow of material through said first means, a third means operated by said second means for thereafter transferring material from said scale member into said first means and a fourth means operated by said second means and adapted to transfer a container of material away from the bottom of said first means and to shift an empty container into position in its place, said second means being arranged through a timing means to operate said third and fourth means in such coordination that the material in said scale member is transferred to said first means before the latter has been completely emptied, and said containers are transferred before any of said last-named material has progressed completely through said first means.

8. A bag loading device comprising a scale member for receiving material to be weighed, a hopper adapted to receive said material from said scale member and to feed said material into bags located below said hopper, a first means positioned near the bottom of said hopper and responsive to almost complete flow of material through said hopper, a second electromagnetic means operated by said first means for thereafter dumping material from said scale member into said hopper and a third electromagnetic means operated by said first means and independent of said second means and adapted to transfer a bag of material away from the bottom of said hopper and to shift an empty bag into position in its place, said first means being arranged through a timing means to operate said second and third means in such coordination that the material in said scale member is dumped into said hopper before the hopper has been completely emptied, and said bags are transferred after substantially all of the residual material in the bottom of said hopper has passed therethrough, but before any of the material being dumped from said scale member has progressed completely through the hopper.

9. A container loading device comprising means for measuring predetermined charges of material, a hopper for filling containers adapted to be located below the hopper, a photoelectric cell unit positioned near the bottom of said hopper and actuated by termination of flow of material in said hopper past said unit, means operable by actuation of said unit for transferring a measured charged of material from said measuring means to said hopper and means operable by actuation of said unit to transfer a container of material away from the bottom of said hopper and to shift an empty container into position in its place.

10. A container loading device comprising means for measuring predetermined amounts of material, a hopper for filling containers, means located below said hopper for supporting said containers in operable relationship with the bottom of said hopper, a photoelectric cell unit including a light source and a photoelectric cell positioned at opposite sides of said hopper near the bottom thereof, said unit being actuated by termination of flow of material in said hopper past said light source and cell, a relay operable in response to actuation of said unit, electromagnetic means controlled by said relay for transferring said material from said measuring means to said hopper and electromagnetic means controlled by said relay to transfer a container of material away from the bottom of said hopper and to shift an empty container into position in its place.

11. A container loading device comprising a hopper having a chute extending therefrom and through which material may flow into a container positioned at the bottom of said chute, at least one scale provided with a weigh bucket positioned above said hopper, a photoelectric cell unit including a light source and photoelectric cell positioned at opposite sides of said hopper near the bottom thereof, said unit being actuated by termination of flow of material in said hopper past said light source and cell, a relay operable in response to actuation of said unit, a first time delay relay controlled by said relay, electromagnetic means actuated through said time delay relay for dumping material from said weigh bucket into said hopper, a second time delay relay controlled by said relay, electromagnetic means actuated by said second time delay relay to transfer a full container of material away from said chute and to shift an empty container into position in its place, the time cycle of said first time delay relay being set for a shorter period than the time cycle of said second time delay relay so that material commences to be dumped from said weigh bucket into said hopper before container transfer occurs.

12. A device as defined in claim 11 having a switch in circuit with said first time delay relay and arranged to permit actuation of its associated electromagnetic means for dumping said weigh bucket only when the material in said bucket has reached a predetermined weight.

13. An automatic weighing and bag loading device comprising a scale member, a hopper for filling bags adapted to be positioned below said hopper, a photoelectric cell unit including a light source and a photoelectric cell positioned at opposite sides of said hopper near the bottom thereof, said unit being actuated by termination of flow of material in said hopper past said light source and cell, a relay operable in response to actuation of said unit, a main source of current in circuit with said relay, a first time delay relay controlled by said relay, a first solenoid actuated through said first time delay relay for transferring material from said scale member to said hopper, a switch in circuit with said first time delay relay and arranged to permit actuation of said first solenoid only when the material in said scale member has reached a predetermined weight, a second time delay relay controlled by said relay and a second solenoid actuated by said second time delay relay to transfer a bag of material away from the bottom of said hopper and to shift an empty bag into position in its place.

14. An automatic weighing and bag loading device comprising at least one scale member, a hopper for filling bags adapted to be positioned below said hopper, a photoelectric cell unit including a light source and a photoelectric cell positioned at opposite sides of said hopper near the bottom thereof, said unit being actuated by termination of flow of material in said hopper past said light source and cell, a first relay operable in response to actuation of said unit, a main source of current in circuit with said first relay, a second time delay relay controlled by said first relay, a third relay actuated by said second time delay relay, a first solenoid operated by said third relay for transferring material from said scale member to said hopper, a switch in circuit with said third relay and arranged to permit operation of said first solenoid only when the material in said scale member has reached a predetermined weight, a fourth time delay relay controlled by said first relay, a fifth relay actuated by said fourth time delay relay, a second solenoid operated by said fifth relay to transfer a bag of material away from the bottom of said hopper and shift an empty bag into position in its place, said second solenoid having means in association with said fifth relay for imparting only a single impulse movement to said solenoid during bag transfer, and the time cycle of said second time delay relay being set for a shorter period than the time cycle of said fourth time delay relay so that material commences to be dumped from said scale member into said hopper before bag transfer occurs.

15. A device as defined in claim 14 having a second scale member, a third solenoid operated by said third relay for transfer of material from said second scale member to said hopper and a second switch in circuit with said third relay and arranged to permit operation of said third solenoid only when the material in said second scale member has reached a predetermined weight, said third relay being provided with switch means whereby, while one scale member is being actuated for transfer of material therefrom to said hopper, the other scale member is in non-dumping load receiving condition.

16. An automatic weighing and bag loading machine adapted to provide a substantially continuous flow of material into bags, comprising a hopper having a chute extending therefrom and through which material may flow into a bag positioned at the bottom of said chute, a laterally movable member for supporting a plurality of bags, each of which is adapted to be alternately placed in position at the bottom of said chute by operation of said member, two scales positioned above said hopper, each provided with a weigh bucket, a photoelectric cell unit including a light source and a photoelectric cell positioned at opposite sides of said hopper near the bottom thereof, said unit being actuated by termination of flow of material in said hopper past said light source and cell, a relay operable in response to actuation of said unit, a first time delay relay controlled by said relay, a first solenoid actuated by said time delay relay for dumping material from one of said weigh buckets into said hopper, a first switch in circuit with said first time delay relay and arranged to permit actuation of said first solenoid only when the material in said weigh bucket has reached a predetermined weight, a second time delay relay controlled by said relay, a second solenoid actuated by said second time delay relay to operate said movable member for transferring a full bag of material way from the bottom of said chute and to shift an empty bag into position in its place, the time cycle of said first time delay relay being set for a shorter period than the time cycle of said second time delay relay so that material commences to be dumped from said weigh bucket into said hopper before bag transfer occurs, a third solenoid actuated by said first time delay relay for dumping material from the second weigh bucket into said hopper, a second switch in circuit with said first time delay relay and arranged to permit actuation of said third solenoid only when the material in said second weigh bucket has reached a predetermined weight, a relay in circuit between said first time delay relay and each of said switches, said relay being provided with switch means whereby, while one weigh bucket is being actuated for dumping material therefrom into said hopper, the other weigh bucket is in non-dumping load receiving condition.

17. An automatic weighing and bag loading machine adapted to provide a substantially continuous flow of material into bags, comprising a hopper having a chute extending downwardly therefrom and through which material may flow into a bag positioned at the bottom of said chute, a laterally movable member for supporting a plurality of bags, each of which is adapted to be alternately placed in position at the bottom of said chute by operation of said member, two scales positioned above said hopper, each provided with a weigh bucket having a bottom comprising a pair of pivoted gates, a photoelectric cell unit including a light source and a photoelectric cell positioned at opposite sides of said hopper near the bottom thereof, said unit being actuated by termination of flow of material in said hopper past said light source and cell, a first relay operable in response to actuation of said unit, a main source of current in circuit with said first relay, a second time delay relay controlled by said first relay, a third relay actuated by said second time delay relay, a first solenoid operated by said third relay for actuating said gates and dumping material from one of said weigh buckets into said hopper, a first limit switch in circuit with said third relay and arranged to permit operation of said solenoid only when the material in said weigh bucket has reached a predetermined weight, a fourth time delay relay controlled by said first relay, a fifth relay actuated by said fourth time delay relay, a second solenoid operated by said fifth relay to actuate said movable member for transferring a full bag of material away from the bottom of said hopper and shifting an empty bag into position in its place, said second solenoid having a limit switch in association with a holding coil on said fifth relay whereby, when said solenoid reaches the end of its stroke, said holding coil is energized, thus deenergizing said solenoid so that it imparts only a single unidirectional movement to said movable member during bag transfer, the time cycle of said second time delay relay being set for a shorter period of time than the time cycle of said fourth time delay relay so that material commences to be dumped from said weigh bucket into said hopper before bag transfer occurs, said third relay being provided with a third switch whereby, while the gates of one weigh bucket are being actuated for dumping material therefrom into said hopper, the gates of said other weigh bucket are closed.

THOMAS J. SKEUSE.
ARTHUR C. JENNINGS.
WARREN E. HAUGHT.

References Cited in the file of this patent
UNITED STATES PATENTS

| Number | Name | Date |
|---|---|---|
| 640,626 | Braun | Jan. 2, 1900 |
| 667,560 | Nickerson | Feb. 5, 1901 |
| 924,570 | Mulloy | June 8, 1909 |
| 1,913,868 | Andreas | June 13, 1933 |
| 2,124,018 | Vogel-Jorgensen | July 19, 1938 |
| 2,301,136 | Moreland | Nov. 3, 1942 |
| 2,340,225 | Nowak | Jan. 25, 1944 |
| 2,353,005 | Behrent | July 4, 1944 |
| 2,381,505 | Lindholm | Aug. 7, 1945 |
| 2,536,516 | Peterson | Jan. 2, 1951 |